(12) United States Patent
Wetzel et al.

(10) Patent No.: US 7,690,147 B2
(45) Date of Patent: Apr. 6, 2010

(54) REARMING ELECTRONIC ANIMAL TRAP WITH BAFFLE, MECHANICAL SWITCH AND MULTIPLE-KILLING-PLATE CONFIGURATION

(75) Inventors: Troy A. Wetzel, Mohnton, PA (US); Robert T. Cruz, Lititz, PA (US); Richard L. Eyer, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 239 days.

(21) Appl. No.: 11/822,607

(22) Filed: Jul. 9, 2007

(65) Prior Publication Data

US 2009/0013587 A1    Jan. 15, 2009

(51) Int. Cl.
    *A01M 23/38* (2006.01)
(52) U.S. Cl. .......................................... 43/98
(58) Field of Classification Search ............. 43/98, 43/99

See application file for complete search history.

(56) References Cited

U.S. PATENT DOCUMENTS

| | | | | |
|---|---|---|---|---|
| 2,302,787 A | * | 11/1942 | Meehan | 43/98 |
| 3,197,916 A | * | 8/1965 | Cole, Jr. et al. | 43/98 |
| 3,468,054 A | * | 9/1969 | Levine | 43/98 |
| 4,074,456 A | * | 2/1978 | Tidwell | 43/98 |
| 4,179,839 A | * | 12/1979 | Salotti et al. | 43/98 |
| 4,205,480 A | * | 6/1980 | Gartner | 43/98 |
| 5,269,091 A | * | 12/1993 | Johnson et al. | 43/98 |
| 5,918,409 A | * | 7/1999 | Carnwath | 43/99 |
| 5,949,636 A | * | 9/1999 | Johnson et al. | 43/98 |
| 6,609,328 B2 | * | 8/2003 | Swift et al. | 43/98 |
| 6,735,899 B1 | * | 5/2004 | Anderson et al. | 43/98 |
| 6,775,947 B2 | * | 8/2004 | Anderson et al. | 43/98 |
| 6,796,081 B2 | * | 9/2004 | Anderson et al. | 43/98 |
| 6,836,999 B2 | * | 1/2005 | Rich et al. | 43/98 |
| 7,010,882 B2 | * | 3/2006 | Rich et al. | 43/98 |
| 7,219,466 B2 | * | 5/2007 | Rich et al. | 43/98 |
| 7,530,195 B2 | * | 5/2009 | Muller et al. | 43/98 |
| 2007/0209270 A1 | * | 9/2007 | Rich et al. | 43/98 |
| 2008/0120895 A1 | * | 5/2008 | Schwartz et al. | 43/98 |
| 2009/0172995 A1 | * | 7/2009 | Wetzel et al. | 43/98 |
| 2009/0223112 A1 | * | 9/2009 | Deibert | 43/99 |

* cited by examiner

*Primary Examiner*—Darren W Ark
(74) *Attorney, Agent, or Firm*—Jacobson Holman PLLC

(57) ABSTRACT

An electric or electronic animal trap with a CPU-controlled, rearming, multiple killing plate configuration and automatically resetting mechanical switch for triggering a high voltage cycle. A high-voltage output circuit is connected to killing plates which are activated with a high-voltage pulse train when a pest closes the mechanical switch. The trap is configured to automatically rearm an indefinite number of times until a first dispatch is detected. Once the first dispatch is detected, the circuit will automatically rearm twice more. Accordingly, a plurality of mice may be dispatched and retained within the trap before the trap requires servicing.

24 Claims, 8 Drawing Sheets

REARMING ELECTRONIC ANIMAL TRAP WITH BAFFLE, MECHANICAL SWITCH AND MULTIPLE-KILLING-PLATE CONFIGURATION

BACKGROUND OF THE INVENTION

1. Field of the Invention

This invention relates generally to electric or electronic animal traps and, more particularly, to an animal trap adapted to catch and electrocute a targeted animal simultaneously stepping on two spaced electrodes, with an assembly including a mechanical switch and a baffle that respectively activate the electrodes and ensure continued contact of the animal with the electrodes.

Although the concepts of the instant invention are equally applicable to traps for animals of any size, devices of this type are primarily utilized in connection with the trapping of rodents such as mice and the description will, therefore, focus on this application.

2. Description of the Related Art

Animal traps using electrically charged plates to kill the target animal are often unsuccessful as the animal may react to the initial voltage by jumping which, depending upon the landing location, can allow the animal to recover and escape. It is also not uncommon for target animals to avoid electrocution by backing out of the trap.

To address these problems, traps having rodent-directing diverter elements have been developed such as those described in U.S. Pat. No. 6,735,899 ("the '899 patent") which is assigned to the present assignee. The disclosure of the '899 patent is hereby expressly incorporated herein by reference as if fully set forth in its entirety.

In the '899 patent, two electrodes in the form of plates are positioned on the floor of the trap housing so as to be separated by a space. Diverter elements positioned within the housing include a downwardly extending baffle mounted to the cover of the trap so that, when the cover is closed, the baffle extends into the space between the electrodes. The electrodes are not activated until the rodent makes contact with both of the plates and the resistance of the rodent is detected. Once a rodent is dispatched so as to remain in contact with the plates, the trap must be serviced. Resistance sensing to activate a high voltage generator to electrocute a rodent is also described in U.S. Pat. No. 5,949,636. Mechanical switch sensing to initiate high voltage is described in U.S. Pat. No. 5,269,091.

U.S. Pat. No. 3,468,054 to Levine also discloses a electrical trap having a baffle that is rotatably mounted within the trap housing. The baffle is coupled to a rod extension that, when pivoted with the baffle in response to contact with a rodent, mechanically closes two switch contacts which activates an electrical circuit to electrocute the rodent. To ensure completion of the electrocution cycle, the rod extension is held in engagement with the switch contacts by a magnet and thus must be manually reset before the trap can be reactivated.

A trap having three plates has also been developed as described in U.S. Pat. No. 7,219,466 ("the '466 patent"), also assigned to the present assignee. The disclosure of the '466 patent is hereby expressly incorporated herein by reference as if fully set forth in its entirety.

Like the two-plate trap in the '899 patent, the three-plate trap set forth in the '466 patent also relies upon the target animal's simultaneous physical contact with at least two of the plates and the sensing of the animal as a resistance value to activate the electrodes. As a result, once a mouse has been electrocuted and remains in contact with the plates, the trap must be serviced before it can be reset.

SUMMARY OF THE INVENTION

In view of the foregoing, an object of the present invention is to provide an electronic animal trap having a plurality of electrodes spaced from another and activated by contact of the target animal with a mechanical switch to activate the high voltage generator. The trap is capable of automatic rearming whether or not the animal is dispatched.

Another object of the present invention is to provide an electronic animal trap in accordance with the preceding object and having a diverter plate or baffle extending downwardly from the cover and positioned adjacent the mechanical switch so that the baffle provides a limited space between its lower edge and the floor of the housing to force a target animal to squeeze under the baffle making it more difficult for the animal to reverse itself when it contacts the second electrode.

A further object of the present invention is to provide an electronic animal trap in accordance with the preceding objects in which the switch is positioned in front of the baffle, with the free edge of the baffle overlying the middle electrode to minimize the risk of rodent escape.

A still further object of the present invention is to provide an electronically-controlled, mechanically triggered animal trap that is able to detect the absence of an animal after a high voltage cycle and thereafter to rearm itself an indefinite number of times without requiring human intervention.

Yet another object of the present invention is to provide an electronically-controlled, mechanically triggered animal trap that is able to detect the presence of an animal after a high voltage cycle and thereafter to rearm itself multiple times to effect multiple kills without requiring human intervention.

Another object of the present invention is to provide an electronically-controlled animal trap, particularly a mouse trap, which will quickly and efficiently electrocute a targeted animal, is simple and inexpensive to manufacture and highly reliable and completely safe in use, with reduced servicing requirements through automatic rearming and mechanical triggering.

In accordance with the foregoing objects, the present invention is directed to an electronic animal trap having a housing with a plurality of electrodes spaced from another on the floor of the housing. A diverter plate or baffle extends downwardly from the cover and is positioned to overlie one of the electrodes so as to provide a limited space between the baffle's lower edge and the upper surface of the electrode. A mechanical switch is positioned adjacent the front side of the baffle and is activated by contact with the target animal as it squeezes under the baffle. Closing of the switch triggers a control circuit to generate a high voltage cycle. Once the high voltage cycle is complete, the control circuit detects the resistance between the electrodes. If a body is not sensed, the trap will rearm and initiate the high voltage cycle an indefinite number of times until a body is sensed. Once a body is sensed, the trap will rearm and can be activated to complete the high voltage cycle a set number of additional times.

Other objects and benefits of the present invention will be readily understood by those with ordinary skill in the art with particular reference to the following detailed description of the preferred embodiments in combination with the accompanying drawings.

DETAILED DESCRIPTION OF THE PREFERRED EMBODIMENTS

Figure 1:
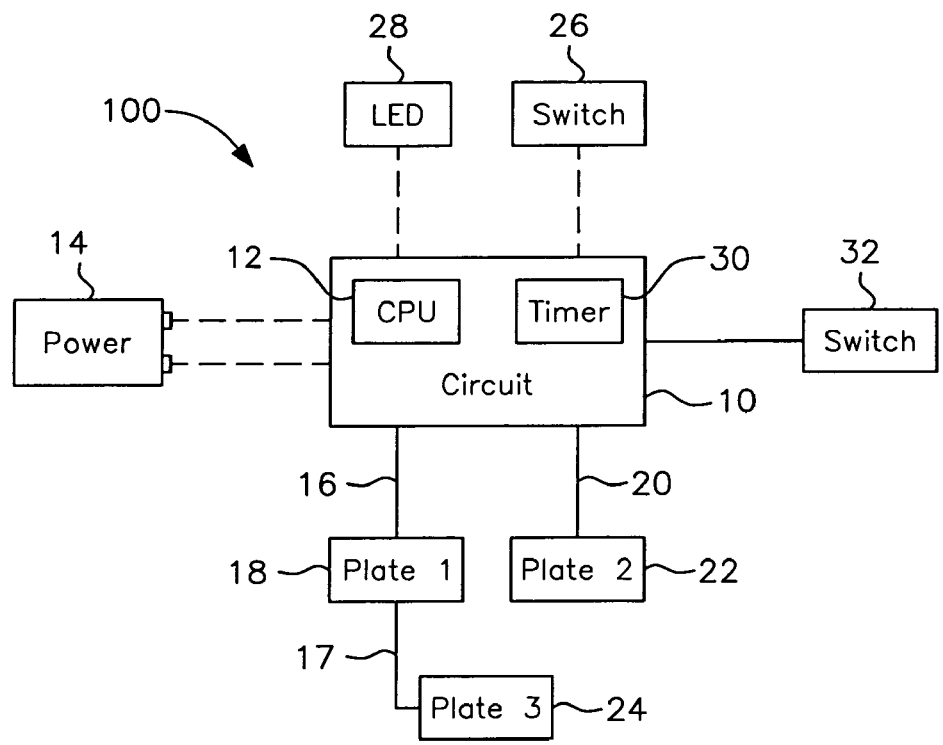
FIG. 1 a block diagram of the high-voltage, rearming circuitry with three-killing-plate configuration and mechanical switch according to the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

FIG. 1 is a block diagram of the rearming circuit components, generally designated by the reference numeral 100, according to the present invention. The circuit components 100 include a high-voltage output circuit 10 controlled by a central processing unit (CPU) 12 and electrically connected to a power supply 14. The CPU 12 may be embodied as a standard 8-bit micro controller chip, and the high output circuit 10 can be a standard fly-back circuit.

A first electrical connection member 16, which may be embodied as a wire, receives current from the high-voltage output circuit 10 and also connects to a first killing plate 18 so that electricity can be provided thereto. A second electrical connection member 20, which may also be a wire, connects the high-voltage output circuit 10 to a second killing plate 22. The first and second killing plates 18, 22 are the plates which are activated when the circuit is triggered. According to a preferred embodiment, a third killing plate 24 is coupled to the first plate 18 by a third electrical connection member 17 and automatically goes to the voltage level of the first plate 18 when the circuit is activated. The circuit is turned on to an enabled state by a switch 26 accessible from the exterior of the trap and adjacent an LED 28 which provides the user with visual indicators of trap operating status.

The circuit 10 further includes a one-shot timer 30 which receives input from a mechanical switch 32 mounted inside the trap. When the switch 32 is closed through contact with a rodent, the timer 30 provides an input signal to the CPU 12 to initiate a high voltage cycle. Full schematic representations of the circuit components 100 are provided in FIGS. 9 and 10 and will be discussed more fully hereinafter.

In use, the high-voltage output circuit 10 is electrically connected to the power supply 14 to convert the power to a high voltage output. The first electrical connection member 16 receives the high voltage output from the high-voltage output circuit 10 and also connects to the first plate 18 so that electricity can be provided thereto. The second electrical connection member 20 connects to the second plate 22 in the middle of the trap which is at a much lower potential than the first and third plates. The third plate 24 adjacent the entrance 60 to the trap is coupled to the first plate by the third electrical connection member 17. As shown, the first, second and third plates 18, 22, 24 are immediately adjacent to one another, but in spaced relationship.

Figure 2:
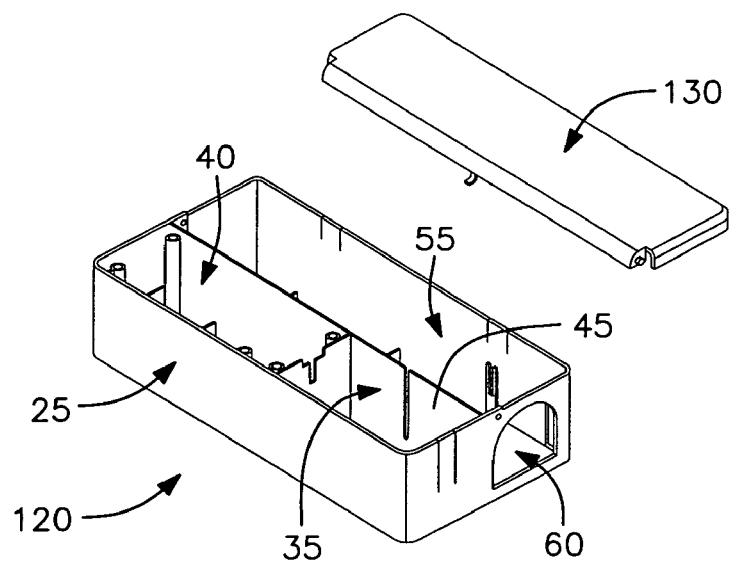
FIG. 2 is an exploded view of a general housing design for the trap assembly according to the present invention.

A housing for the various trap embodiments of this invention is illustrated at 120 in FIG. 2 and can be formed of plastic, metal or other suitable material. The housing 120 includes a base 25 and a cover 130 hingedly secured thereto in a well known manner. The base 25 is divided longitudinally by a separator 35 to provide compartments on one side for reception of the electronic circuitry (not shown) at 40 and batteries (not shown) at 45.

The switch 26 or button that toggles from an "on" or standby position, in which the circuit may be activated, to an "off" or reset position may be mounted on the cover 130 or on the base 25. The LED 28 is preferably mounted on the cover for greater visibility and acts to provide visual indications of the activity and status of the trap. The LED 28 turns "on" or flashes to provide a visual indication to the user during activation of the trap and thereafter when the trap contains a dead mouse as will be more fully described hereinafter. Additional LEDs may also be included should separate indicators of differing colors be desired. Additionally, a pair of contacts (not shown) can be incorporated in the base 25 and cover 130 so that when the cover 130 is lifted to access the interior of the base 25, the circuit is broken to preclude injury to the user. Such a safety contact system is disclosed in U.S. Pat. No. 6,609,328, also assigned to the present assignee and hereby expressly incorporated herein by reference as if fully set forth herein in its entirety.

The power supply 14 which provides power to the trap can include one or more batteries, such as two AA batteries. Alternatively, the trap may be electrically connected to a wall outlet. When embodied as a battery, the power supply 14 may be conveniently located in the power supply area 45.

Figure 3:
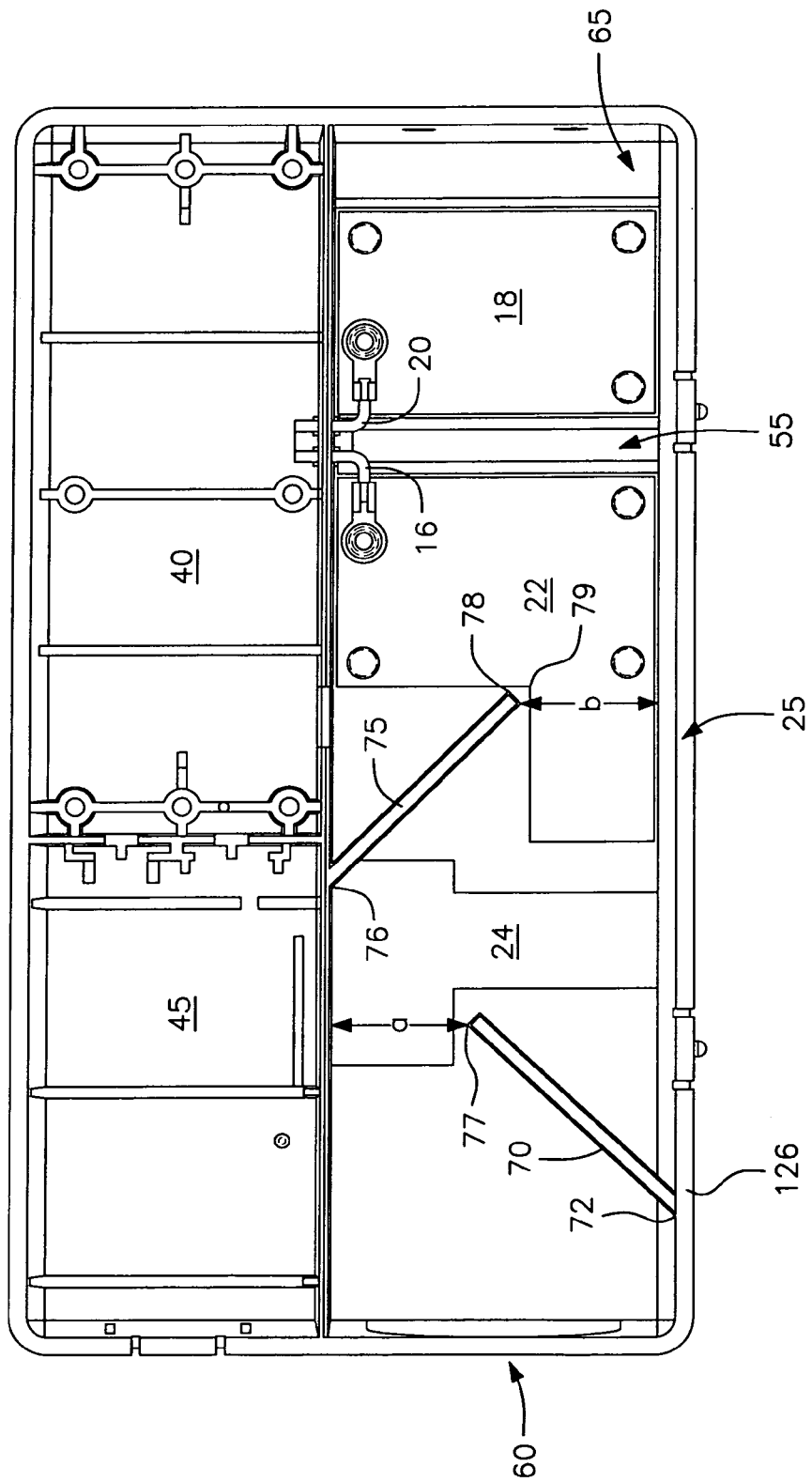
FIG. 3 is a top plan view of the base of one preferred embodiment of an animal trap according to the present invention with the cover and electronic components removed for illustrative clarity.
Figure 4:
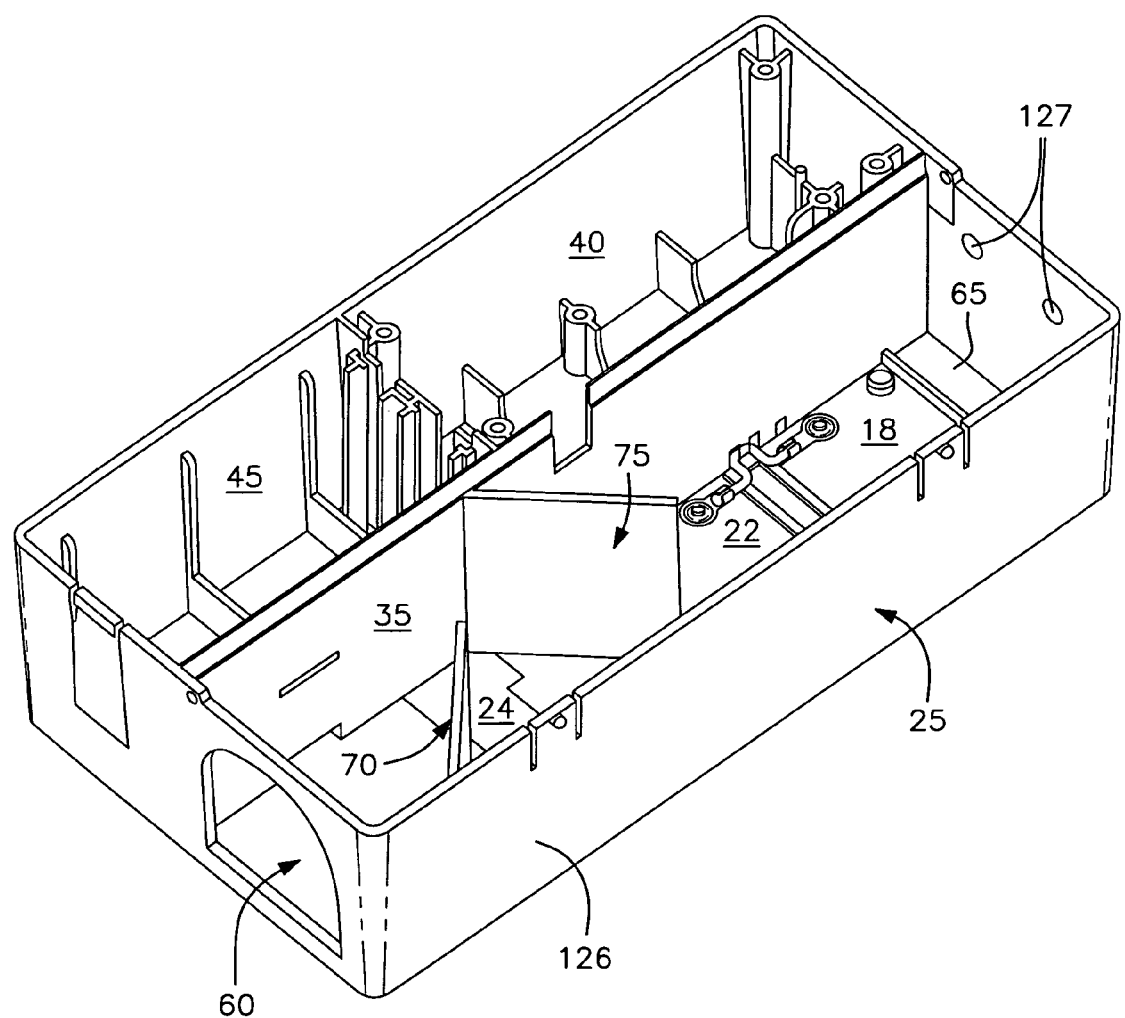
FIG. 4 is a perspective view of the trap housing base of the embodiment of FIG. 3.

A top view and a perspective view of a representative trap base 25 according to the present invention is illustrated in FIGS. 3 and 4. The base 25 includes the three spaced charge plates or electrodes 18, 22, 24 electrically connected in a well-known manner to the electronic circuit 100. A pathway is defined between the side wall 126 of the housing base 25 and the separator 35 from the trap opening entrance 60 to a bait receiving location 65, with the charge plates 18, 22, 24 interposed in this path. Ventilation holes 127 may be provided adjacent the bait receiving location 65 to draw mice toward the trap.

According to a preferred embodiment, a first fixed barrier or diverter member 70 is positioned before the third plate 24. The diverter 70 has one end 72 fixed to the side wall 126, and extends at approximately a 45° angle away from the entrance 60, with its second end 77 spaced from the separator 35 by a distance "a" which is sufficient for an animal to pass through. A second fixed barrier or diverter member 75 is positioned after the third plate 24 and before the first plate 18. The diverter 75 has one end 76 fixed to the separator 35, and extends at approximately a 45° angle away from the entrance 60, with its second end 78 spaced from the side wall 126 by a distance "b" which is sufficient for an animal to pass through. The diverters 70, 75 extend upwardly at least substantially the full height of the side walls 126 of the housing 120 so as to preclude an animal passing over the top thereof when the cover 130 is closed. Alternatively, only one diverter may be included which would preferably be diverter 75; additional diverters could also be included.

As can be seen in FIGS. 3 and 4, the second electrode 22 is embodied as an L-shaped plate. The end or edge portion 78 of the diverter 75 extends into the inner corner 79 defined by the L-shaped plate 22 so that an animal contacting the diverter 75 is already in contact with the second plate 22 and, depending on the size of the rodent, may still be in contact with the third plate 24 as well.

Figure 5:
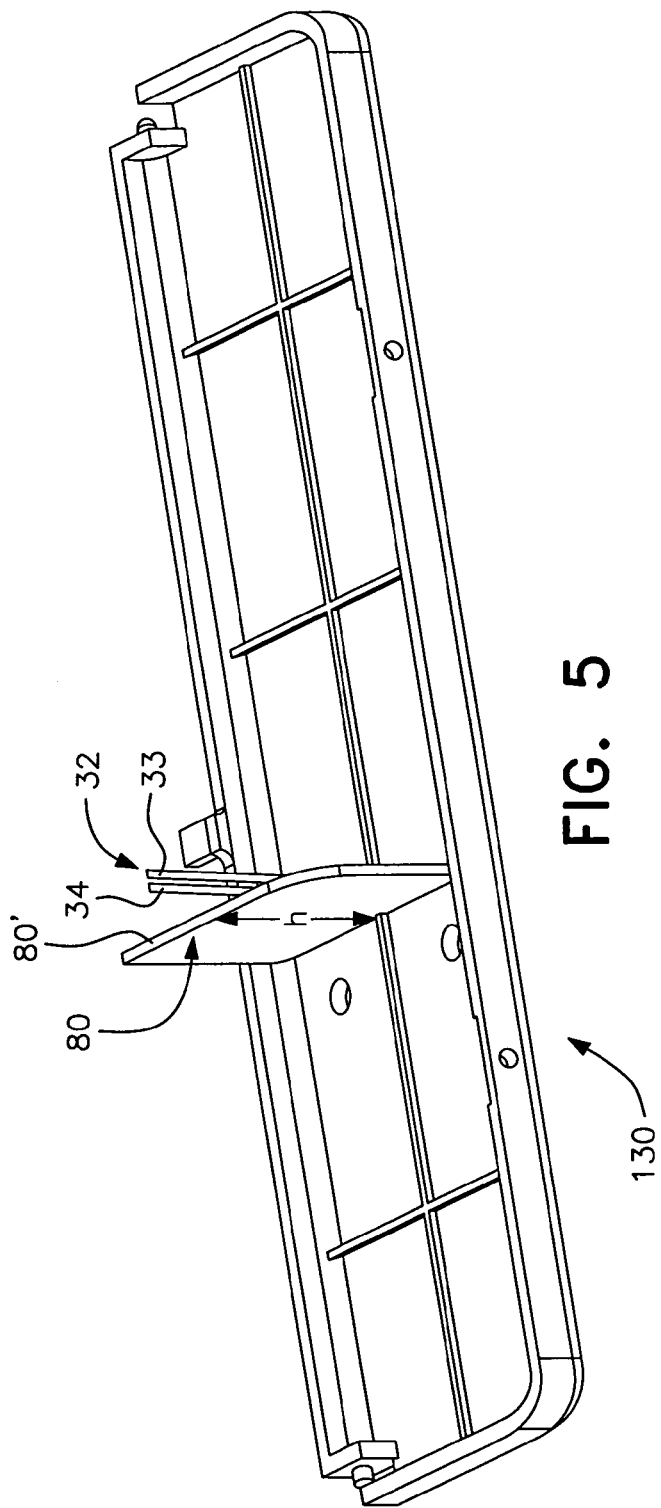
FIG. 5 is a perspective view of a cover for the trap housing of FIG. 3 carrying a mechanical switch and a diverter or barrier which extends into the trap over the middle electrode when the cover is closed.
Figure 6:
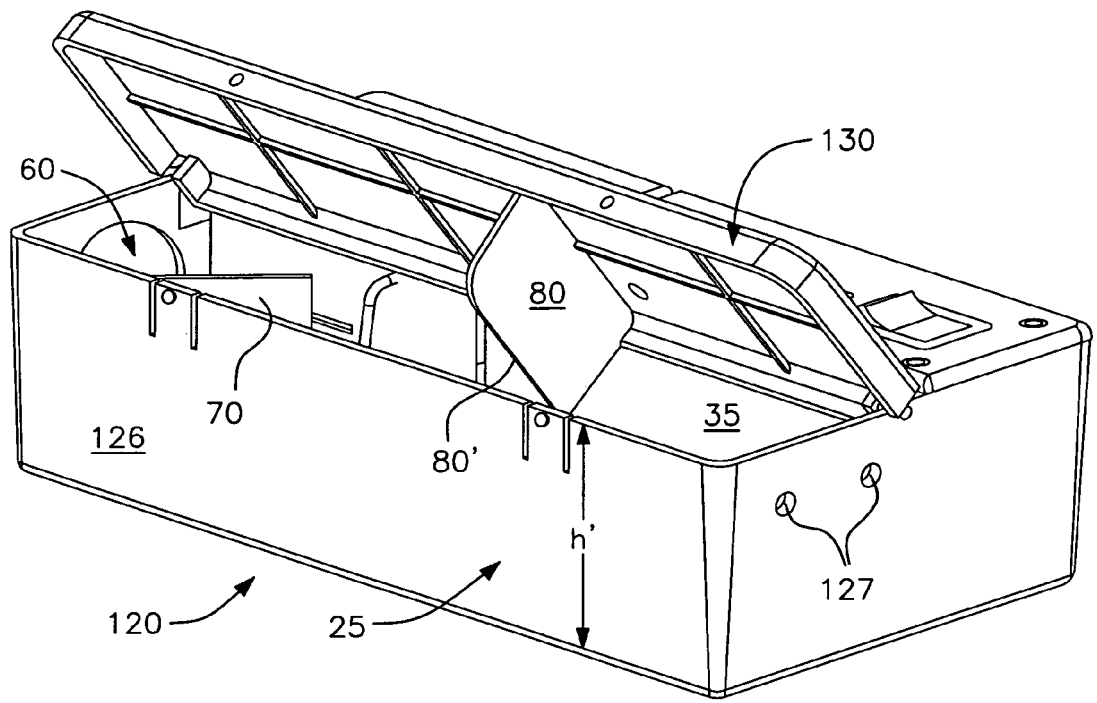
FIG. 6 is a perspective view of the trap of FIG. 3, with the cover shown in FIG. 5 in a partially closed position.

Referring now to FIGS. 5 and 6, the cover 130 of the trap according to the present invention has a second diverter or barrier 80 affixed to the underside thereof which is positioned along the length of the cover 130 to extend into the space over the second electrode 22 when the cover 130 is pivoted to its closed position. The height "h" of the barrier 80 is less than the height of the side walls of the housing 120 to provide a limited space between the lower edge 80' of the barrier 80 and the floor of the base 25 to force a target animal to squeeze under the barrier 80 as it moves toward the bait. Thus, at the time the animal passes under the barrier 80, its body is extended and contorted such that withdrawal from contact with the electrodes is rendered more difficult.

Although the diverter 80 is preferably carried by an openable cover, it could be carried by a fixed cover if access to the chamber for disposing of the electrocuted carcasses is provided elsewhere, or, for that matter, it could be fixed to the sides of the pathway. While it is evident that a diverter such as 80 is best used in conjunction with the angled diverter as shown in FIGS. 3 and 4, it has independent utility in minimizing escape from an electric or electronic trap of other constructions.

Figure 8B:
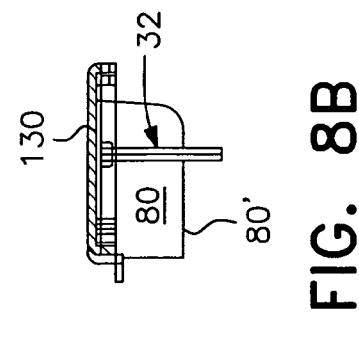
FIG. 8B is an end view of the cover of FIG. 5.
Figure 8A:
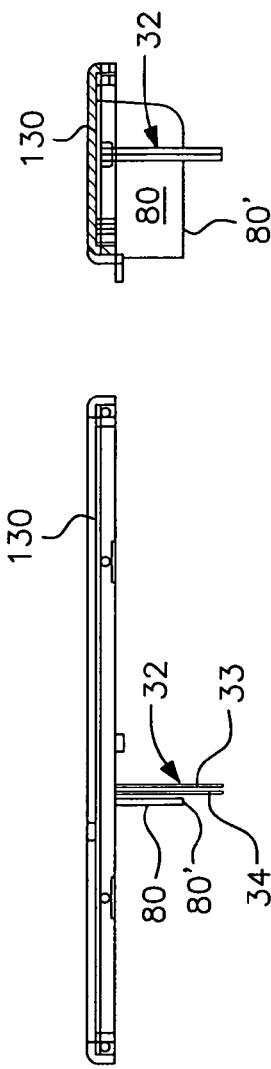
FIG. 8A is a side view of the cover of FIG. 5.
Figure 7:
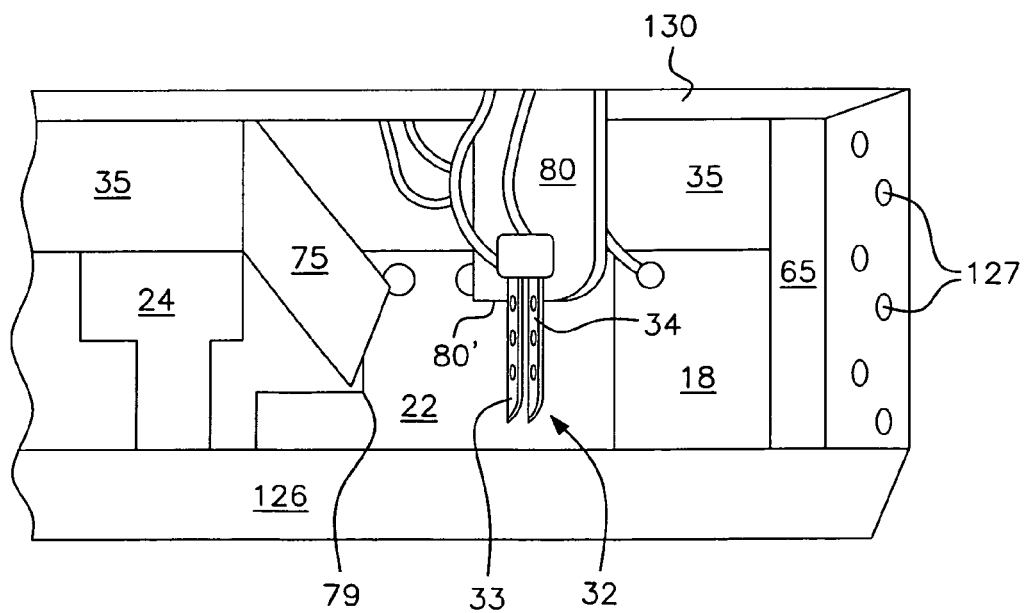
FIG. 7 is another perspective view of the trap of FIG. 6 showing the diverter and mechanical switch as overlying the middle electrode with the cover in a partially closed position.
Figure 9:
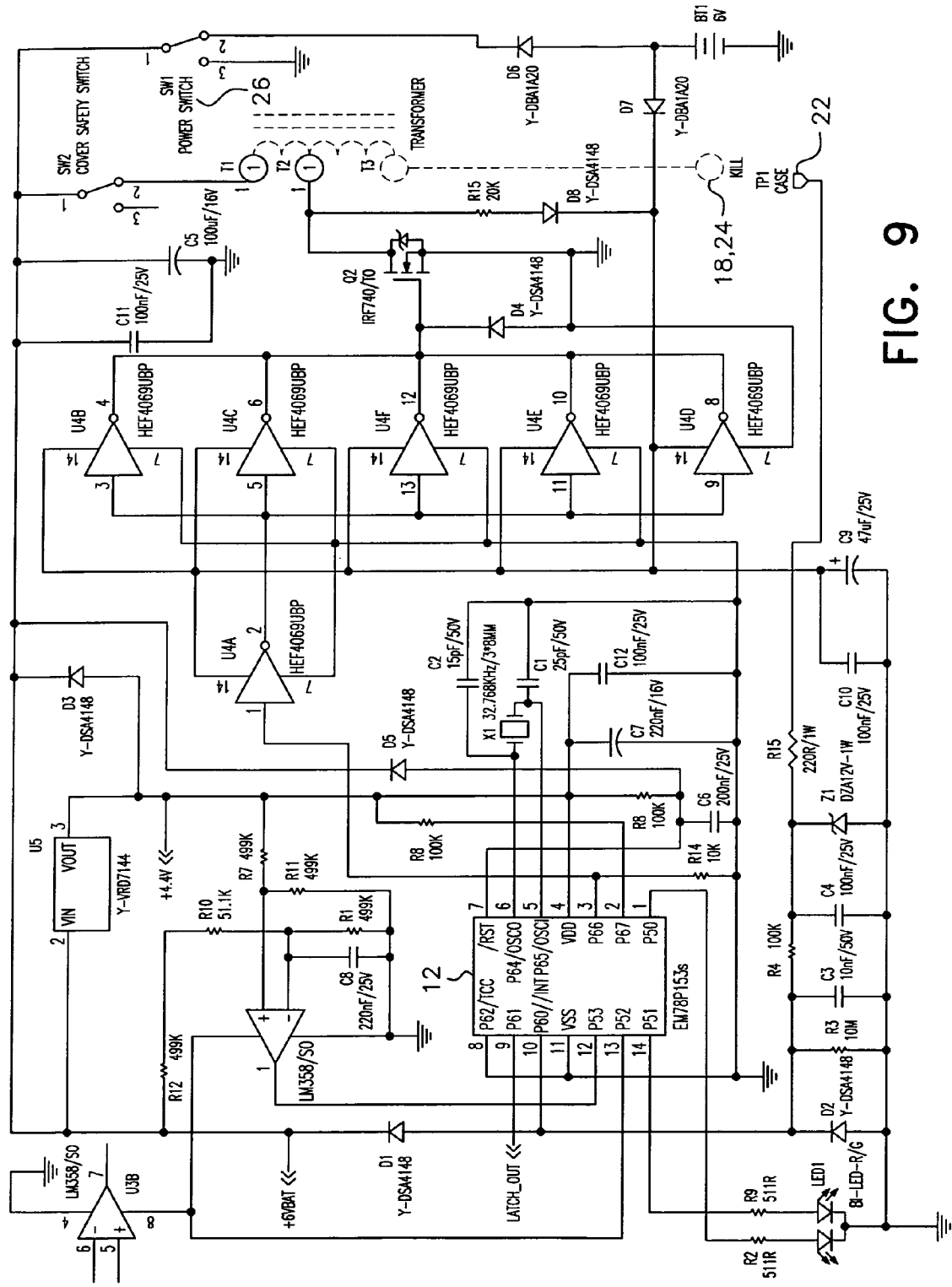
FIG. 9 sets forth a schematic illustration of the rearming electronic circuit with three-killing-plate configuration of the present invention.
Figure 10:
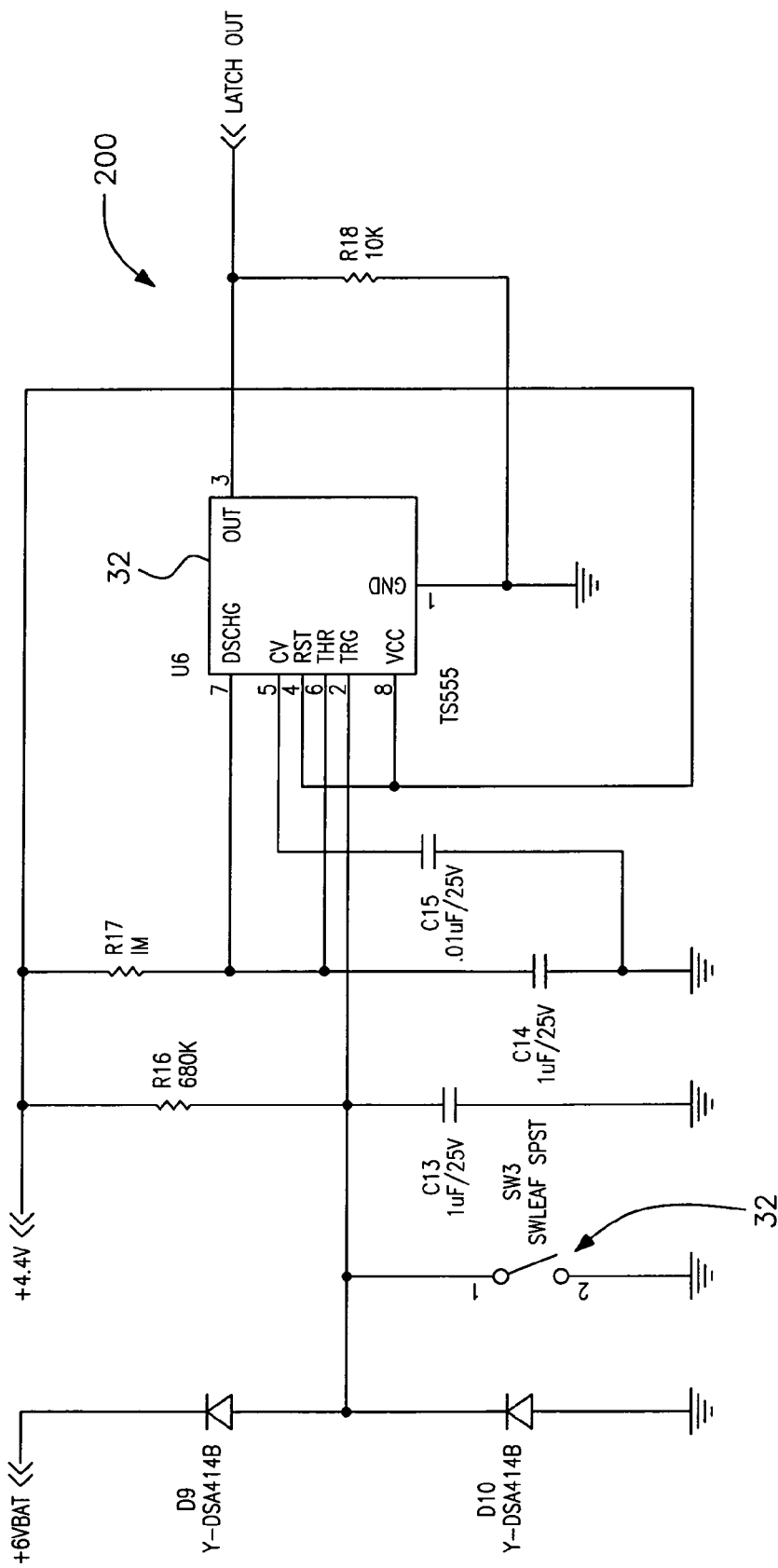
FIG. 10 sets forth a schematic illustration of a latching circuit and mechanical switch as electronically coupled to the circuit of FIG. 9.

As shown in FIGS. 7, 8A and 8B, immediately adjacent the barrier 80 and also mounted to the cover 130 is the mechanical switch 32. The switch 32 is connected to a latching circuit 200 that includes the one-shot timer 30, as schematically shown in FIGS. 9 and 10. From a standby condition, closure of the switch by a rodent results in the latching circuit 200 providing a one-second pulse output to pin 9 of the CPU 12. This pulse initiates wake-up of the CPU 12 which occurs approximately 0.25 to 0.50 seconds after switch closure due to the hardware of the CPU microprocessor.

Upon waking, the CPU 12 initiates delivery of a high voltage pulse train to the killing plates 18, 22, 24 after a preset delay of about one second. This one-second delay before plate activation is intended to allow time for the rodent to move forward toward the back plate 18 to ensure that the rodent will be physically across the plates when the high voltage is generated.

After providing the one-second output, the latching circuit 200 automatically reverts to a standby condition to be reactivated by switch closure. Therefore, no reset signal is required or received by the timer. The timer 30 may be embodied as a TS555 timer, or other low power single CMOS timer device as would be known by persons of ordinary skill in the art.

The switch 32 is mounted in front of, and as closely as possible to, the barrier 80 as shown in FIG. 8A. In this position, the switch extends beyond the lower edge 80' of the barrier 80 as shown in FIGS. 8A and 8B so that a rodent squeezing under the barrier necessarily contacts the switch 32.

The switch 32 is preferably embodied as a modified leaf switch having a long lever arm or "feeler probe," often referred to as a whisker switch. Like a leaf switch, the whisker switch 32 has two pieces or strips of metal 33, 34 that make contact to activate the switch. The switch is silent and durable, having a minimum number of moving parts. Unlike a leaf switch, however, the switch 32 does not use a button to push the metal strips into contact with one another. Rather, the rodent, in squeezing under the barrier 80, pushes metal strip 33 into contact with metal strip 34. The metal strips 33, 34 are long and thin, hence the term "whisker." Due to the mechanical advantage of their length, the metal strips act like lever arms so that the whisker switch requires very little force to trip. The stroke length needed to trigger the switch is also very small so the whisker switch will not wear down as a result of cyclic fatigue.

Figure 11:
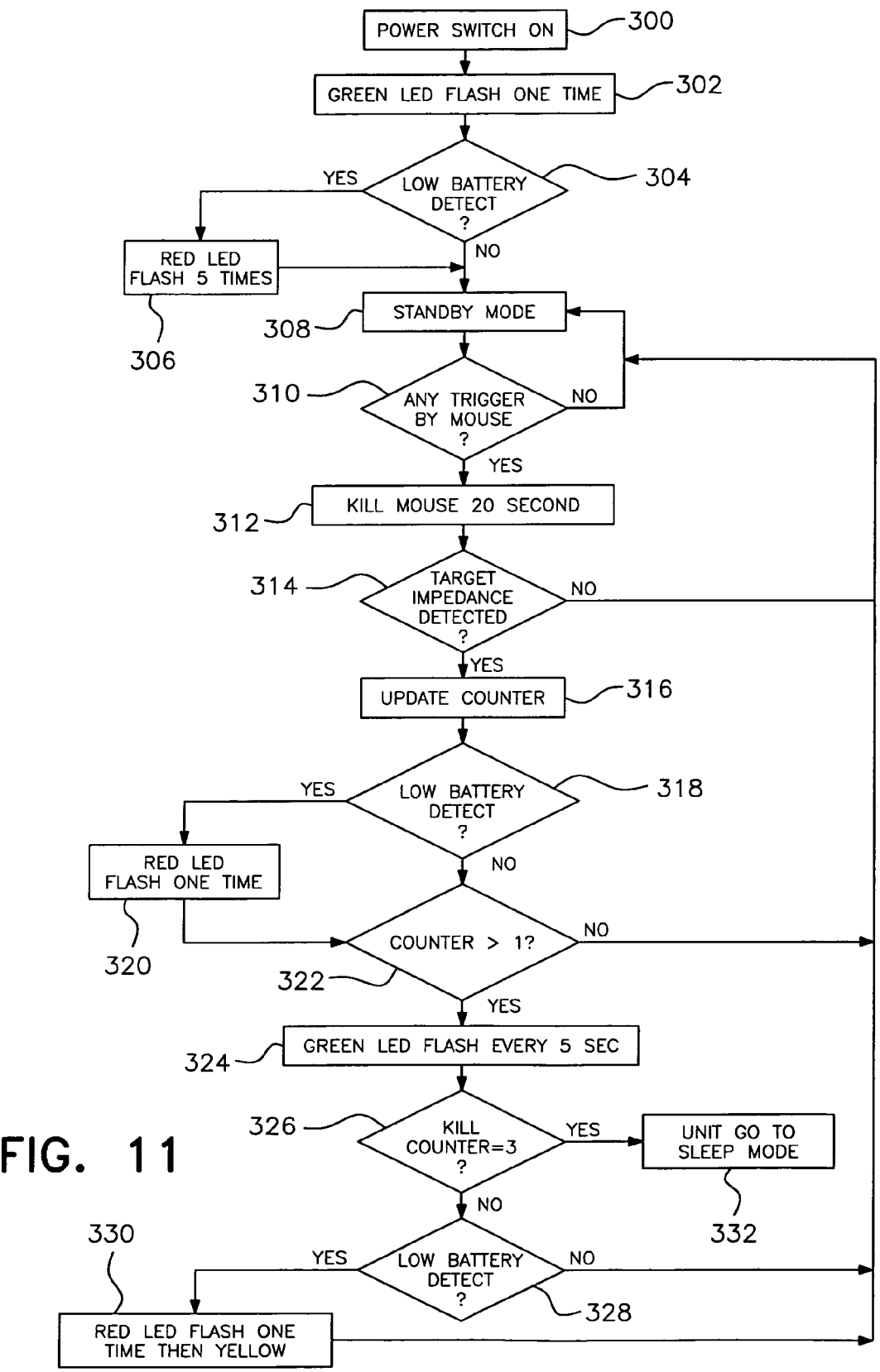
FIG. 11 is a flow chart outlining the operation of the rearming electronic circuit of the present invention.

Operation of the trap is summarized in the flow chart of FIG. 11. To commence operation of the trap, power is applied to the high-voltage output circuit 10, either from a battery or an electrical outlet. The unit is turned on, step 300, by a user using the switch 26, thereby placing the trap into an enabled condition. Upon entry into the enabled condition, the LED 28 flashes green once, step 302, and then turns off. The high-voltage output circuit 10 detects the battery status and, if the battery power is low, step 304, the LED flashes red a set number of times such as five, step 306, as a visual indicator to the user that the batteries should be replaced. Upon conclusion of the red LED flashing procedure, and also if the battery power is found to be sufficient in step 304, the unit remains in the enabled condition in a standby mode, step 308.

As an alternative indicator in the event of low battery power, the LED may flash red on a continuing and regular basis. If the trap includes only one LED, then green flashing thereof concurrent with the red flashing will change the output color of the LED to indicate to the user that both conditions are being reported. The red and green colors are provided by diodes of appropriate colors within the circuit.

The circuit 100 is triggered or activated, step 310, when a pest creates contact between the metal strips 33, 35 of the whisker switch 32. As previously discussed, after contact and CPU wake-up, there is a predetermined delay, preferably a one second delay, before activation. Once activated, the circuit 10 delivers a high voltage pulse train to the killing plates for a fixed time period, preferably about a 20-second killing cycle, step 312. Upon completion of the killing cycle, high voltage across the plates is terminated, and the circuit checks to determine if a target impedance is measured between the killing plates, step 314. According to a preferred embodiment, the target impedance is between about 10 kΩ and 1 MΩ measured between the plates.

If the circuit is open between the plates indicating that the pest escaped, the trap automatically resets and returns to the standby mode, step 308.

If the target impedance is measured after the killing cycle, a kill counter in the CPU is updated by one, step 316, and the battery level is checked, step 318. As before, if the battery power is low, step 318, the LED flashes red one or more times, step 320, as a visual indicator to the user that the batteries should be replaced. Upon conclusion of the red LED flashing procedure, and also if the battery power is found to be sufficient in step 318, the unit checks the kill counter, step 322, to determine if the counter value is greater than one. If not, the circuit resets and returns to the standby mode, step 308.

If the counter value is greater than one, step 322, the LED blinks green continuously every five seconds, step 324, indicating that the trap has sensed one kill and can no longer sense any further kills until it is reset. The kill counter is then checked to see if the counter value is equal to three, step 326. If the kill counter value is less than three, the battery level is checked, step 328. If the battery power is low, step 328, the LED flashes red one or more times and then yellow, step 330, as a visual indicator to the user that the batteries should be replaced and that more than one kill has been detected. The trap then resets, i.e., returns to the active standby mode, step 308. If the battery power is not low, step 328, the trap resets to return to the active standby mode, step 308.

Once the kill counter has a value of three, step 326, the unit enters the sleep mode, step 332, in which the trap will no longer respond to the one-second pulse input received from the latching circuit 200 indicating switch closure. The circuit does, however, preferably continue to check the battery power at regular intervals and to provide LED indications whether the battery power is good (green LED) or low (red LED).

As described, after the first dispatch is sensed, the high voltage cycle can be triggered via actuation of the switch 32 a limited number of additional times. According to a preferred embodiment, this number is twice more for a total kill counter value of three. Thereafter the unit's power switch 26 must be toggled to rearm the trap.

If there is no target impedance after the high voltage cycle i.e., an open circuit (static voltage) is sensed between the killing plates, the unit rearms to the enabled condition in standby mode, and thereafter awaits another switch closure. The circuit will rearm and can be triggered by the pulse output of the latching circuit 200 an unlimited number of times until the first dispatch is sensed.

As described above, the rearming trap according to the present invention can dispatch and retain multiple rodents before servicing is required. This is made possible by the design of the mechanical whisker switch and the fact that it has been determined that mice are not repelled by the presence of a dead mouse but may, in fact, be attracted thereto. This known behavior of mice, in conjunction with a mechanically operated switch, enables the present trap to continue to operate effectively even when one or more dead mice are in continuing contact with one or more of the plates 18, 22, 24.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An electronic pest trap comprising:
    a trap body having a power source, a cover having an opened position and a closed position for allowing user access into said trap body in said opened position and for closing said trap body in said closed position, and a switch mechanism for placing said trap into an active standby mode;
    an entrance opening providing a pest with access into said trap body;
    a pair of spaced killing plates positioned within said trap body;
    a pathway leading from said entrance opening into a trap interior and over said killing plates;
    a high-voltage generator coupled to said pair of spaced killing plates;
    a barrier having a bottom edge extending downwardly from inside said cover when said cover is in said closed position into said trap interior to reduce a size of said pathway and force an incoming pest into close contact with said killing plates and to be adjacent one of said plates;
    a mechanical switch positioned within said trap body adjacent said barrier for triggering said generator to generate a high voltage cycle; and
    a timing mechanism for terminating current flow to said killing plates upon completion of said high voltage cycle; and
    said trap being configured to automatically return to said active standby mode an indefinite number of times until a first dispatch is detected and to automatically return to said active standby mode a set number of times once said first dispatch has been detected.

2. The electronic pest trap of claim 1, wherein said mechanical switch is a whisker switch.

3. The electronic pest trap of claim 1, wherein said generator is triggered approximately one second after the mechanical switch is closed.

4. The electronic pest trap of claim 1, wherein said first dispatch is detected by sensing impedance across the plates.

5. The electronic pest trap of claim 1, wherein said mechanical switch includes a strip of conductive material that extends beyond said bottom edge of said barrier.

6. The electronic pest tray of claim 1, wherein said mechanical switch is interposed between said entrance opening and said barrier.

7. An electronic pest trap comprising:
    a trap body having a power source, a cover having an opened position and a closed position for allowing user access into said trap body in said opened position and for closing said trap body in said closed position, and a switch mechanism for placing said trap into an active standby mode;
    first, second and third spaced killing plates positioned within said trap body, said third killing plate electrically connected to said first killing plate;
    a high-voltage automatic rearming circuit coupled to said first and second spaced killing plates;
    a fixed barrier having a bottom edge extending downwardly from inside said cover when said cover is in said closed position;
    an automatically resetting mechanical switch positioned within said trap body adjacent said fixed barrier for triggering said circuit to generate a high voltage cycle; and
    a timing mechanism for terminating current flow to said killing plates upon completion of said high voltage cycle;
    said circuit being configured to automatically rearm upon conclusion of said high voltage cycle.

8. The electronic pest trap of claim 7, wherein said mechanical switch is a whisker switch.

9. The electronic pest trap of claim 8, wherein said whisker switch extends beyond said barrier bottom edge and is positioned with a free end of said switch overlying one of said killing plates when the cover is in the closed position.

10. The electronic pest trap of claim 9, wherein spacing between said whisker switch free end and the one of said killing plates is sufficiently small to prevent a target pest from passing beneath said barrier without triggering said switch.

11. The electronic pest trap of claim 8, wherein said whisker switch is coupled to a one-shot timer that outputs a single pulse to said rearming circuit each time said switch is closed.

12. The electronic pest trap of claim 7, wherein said mechanical switch is interposed between an entrance opening to said trap body and said barrier.

13. The electronic pest trap of claim 7, wherein said circuit is further configured to check a stored dispatch counter once a first dispatch has been detected.

14. An animal trap comprising:
a housing including a base having a floor and side walls and defining an interior chamber, and a cover for said chamber;
an entrance opening communicating with said chamber;
a pathway leading from said entrance opening along the interior chamber of said housing;
a plurality of spaced electrodes interposed in said pathway and control circuitry electrically connected to said electrodes to initiate an electrical shock when voltage is applied to said electrodes;
a fixed barrier extending downwardly from said cover and having a bottom edge spaced from and overlying one of said electrodes when said cover is closed;
a mechanical switch having a lever arm of conductive material extending downwardly from said cover and positioned adjacent said barrier, said lever arm in close proximity to a further strip of conductive material extending downwardly from said cover; and
at least one diverter interposed in said pathway to direct a target animal toward said barrier and mechanical switch.

15. The animal trap of claim 14, wherein said lever arm has a free end that extends downwardly beyond said barrier bottom edge.

16. The animal trap of claim 15, wherein said mechanical switch is interposed between said entrance opening and said barrier.

17. The animal trap of claim 16, wherein said mechanical switch is a whisker switch.

18. The animal trap of claim 17, wherein said whisker switch is coupled to a latching circuit that outputs a single pulse to said control circuitry upon switch closure to initiate said electrical shock.

19. The animal trap of claim 15, wherein spacing between said free end and the electrode which said fixed barrier overlies is sufficiently small to prevent a target pest from passing beneath said barrier without closing said mechanical switch.

20. The animal trap of claim 14, wherein said plurality of electrodes includes first, second and third electrodes spaced from one another in series, said first and third electrodes being electrically connected to have the same potential.

21. The animal trap of claim 20, wherein said barrier overlies said second electrode which is between said first and third electrodes.

22. The animal trap of claim 20, wherein said circuitry connected to said electrodes is configured to automatically rearm said trap upon conclusion of a high voltage cycle.

23. The animal trap of claim 22, wherein said circuitry is further configured to check a stored dispatch counter once a first dispatch has been detected.

24. The animal trap of claim 23, wherein said circuitry is configured to automatically rearm said trap a set number of times once said first dispatch has been detected and to automatically rearm said trap an indefinite number of times until a first dispatch is detected.

* * * * *